(12) United States Patent
Kodama et al.

(10) Patent No.: US 8,823,200 B2
(45) Date of Patent: Sep. 2, 2014

(54) DRIVE UNIT FOR WINDMILL

(75) Inventors: Haruo Kodama, Gifu (JP); Naohiko Yamamoto, Gifu (JP)

(73) Assignee: NABTESCO Corporation, Tokyo (JP)

( * ) Notice: Subject to any disclaimer, the term of this patent is extended or adjusted under 35 U.S.C. 154(b) by 130 days.

(21) Appl. No.: 13/641,319

(22) PCT Filed: Apr. 11, 2011

(86) PCT No.: PCT/JP2011/058983
§ 371 (c)(1),
(2), (4) Date: Nov. 7, 2012

(87) PCT Pub. No.: WO2011/129292
PCT Pub. Date: Oct. 20, 2011

(65) Prior Publication Data
US 2013/0127272 A1    May 23, 2013

(30) Foreign Application Priority Data
Apr. 16, 2010  (JP) .................. 2010-095123

(51) Int. Cl.
| F03D 9/00 | (2006.01) |
| H02P 9/04 | (2006.01) |
| F03D 11/02 | (2006.01) |
| H02K 7/116 | (2006.01) |

(52) U.S. Cl.
CPC ............... *F03D 11/02* (2013.01); *Y02E 10/723* (2013.01); *F03D 9/002* (2013.01); *Y02E 10/725* (2013.01); *H02K 7/116* (2013.01); *Y02E 10/722* (2013.01)
USPC .................................. 290/55; 310/83; 310/77

(58) Field of Classification Search
CPC ........... H02K 7/116; F03D 7/04; F03D 11/02; F03D 9/002; F05B 2260/40311; Y02E 10/722; Y02E 10/723; Y02E 10/725; Y02E 10/72; Y02E 10/74; Y02E 10/728
USPC ....................... 290/55, 54, 44, 43; 310/83, 77
See application file for complete search history.

(56) References Cited

U.S. PATENT DOCUMENTS

| 5,800,137 A | 9/1998 | Eitai et al. | |
| 2012/0009066 A1* | 1/2012 | Vilbrandt et al. ............. | 416/153 |
| 2012/0244989 A1* | 9/2012 | Winkelmann ................. | 475/331 |

FOREIGN PATENT DOCUMENTS

| JP | 08-319945 A | 12/1996 |
| JP | 10-009122 A | 1/1998 |
| JP | 2001-289149 A | 10/2001 |
| JP | 2003-314699 A | 11/2003 |
| JP | 2004-232500 A | 8/2004 |
| JP | 2007-132207 A | 5/2007 |
| JP | 2007-224843 A | 9/2007 |

OTHER PUBLICATIONS

International Search Report; PCT/JP2011/058983; Jun. 14, 2011.

\* cited by examiner

*Primary Examiner* — Javaid Nasri
(74) *Attorney, Agent, or Firm* — Studebaker & Brackett PC

(57) ABSTRACT

A cutaway portion is provided in a driving force transmission path and serves as a disconnection mechanism for disconnecting the driving force transmission path under the action of a torque of a predetermined magnitude or more, the driving force transmission path being a path through which a driving force is transmitted from an output shaft to a pinion. A partitioning portion is provided inside the body and disposed between the cutaway portion and a speed reduction portion so as to partition an area between the cutaway portion and the speed reduction portion.

5 Claims, 6 Drawing Sheets

DRIVE UNIT FOR WINDMILL

TECHNICAL FIELD

The present invention relates to a drive unit for a windmill that is installed in a windmill and drives one structure to rotate relative to another structure in a movable portion of the windmill.

BACKGROUND ART

Windmills that have conventionally been used as wind power generators include those that are each provided with a nacelle that is rotatably installed on the top portion of a tower and in which electricity generators and so on are disposed, and blades that are rotatably installed on a hub (main shaft portion) provided on the nacelle. In such a windmill, yaw drive units, pitch drive units, or the like are installed as drive units for a windmill that drive one structure to rotate relative to another structure in a movable portion of the windmill. The yaw drive units are configured to drive the nacelle, which is the one structure, to rotate relative to the tower, which is the other structure, thus allowing the nacelle to turn in accordance with the wind direction. The pitch drive units are configured to drive shaft portions of the blades, each of which is the one structure, to rotate relative to the hub on the nacelle side, which is the other structure, thus enabling control of the pitch angles of the blades.

Patent Document 1 discloses a drive unit for a windmill that serves as a yaw drive unit that includes an electric motor and a pinion that is attached to an output shaft of the electric motor and outputs a rotational driving force, and rotationally drives the nacelle by causing the pinion to mesh with a ring gear that is fixed to the top portion of the tower. Patent Document 1 also discloses a braking mechanism for stopping the output shafts of electric motors of two drive units for a windmill by simultaneously driving these electric motors in opposite directions of rotation.

CITATION LIST

Patent Document

Patent Document 1: JP 2001-289149A (page 4, FIGS. 1 and 2)

DISCLOSURE OF THE INVENTION

Problem to be Solved by the Invention

In the case of using the drive unit for a windmill disclosed in Patent Document 1, a plurality of such drive units for a windmill are installed and a rotational operation of the nacelle is performed by the operation of these drive units for a windmill. When the braking mechanism is activated, the output shafts of the electric motors of the plurality of drive units for a windmill are stopped. On the other hand, in the case where external forces caused by the wind act on the nacelle of the windmill (when external forces act on the other structure in a movable portion of the windmill), if the braking mechanism is in its activated state, the forces will act on the drive units for a windmill with the output shafts of their electric motors stopped. If the nacelle is being rotated when external forces act on the nacelle, forces in the direction opposite to the direction in which the nacelle is rotationally driven may act on the drive units for a windmill. At this time, if there is variation in the state of meshing engagement between each pinion fixed to the output shaft of each electric motor and the ring gear, a situation tends to arise in which the aforementioned external forces intensively act on only one drive unit for a windmill. In the case of using the drive unit for a windmill disclosed in Patent Document 1, if external forces intensively act on only one drive unit for a windmill, there is the possibility that the drive unit for a windmill may be broken as a result of such damage that makes continuous use of the drive unit difficult and requires replacement occurring to the drive unit for a windmill due to the influence of excessive external forces acting on the single drive unit for a windmill.

There is also another possibility that the output shaft of the electric motor of one drive unit for a windmill may be locked due to some sort of problem, or a brake on only a single drive unit for a windmill may not be able to be released due to abnormality in the control system or the like. If the output shaft of an electric motor is locked as described above, excessive external forces will act on one drive unit for a windmill by the force of the other drive units for a windmill, causing such damage that makes continuous use of the drive unit difficult and requires replacement. Furthermore, if one drive unit for a windmill is broken and its pinion cannot be rotated by even excessive external forces, it means a loss of the yaw drive function of the wind power generator and accordingly a loss of the function of generating electric power. While the above description takes the drive unit for a windmill that serves as a yaw drive unit as an example, the same problem arises for a drive unit for a windmill that serves as a pitch drive unit that drives the shaft portions of the blades to rotate relative to the hub on the nacelle side.

From the viewpoint of providing a mechanism capable of solving the aforementioned problems and for preventing breakage in a drive unit for a windmill, some of the inventors of the present invention have devised a nacelle rotating mechanism disclosed in the specification of Japanese Patent Application No. 2008-272420. It should be noted that at the time of filing the basic application on which the present application claims priority, Japanese Patent Application No. 2008-272420 had not yet been published, and the nacelle rotating mechanism disclosed in the specification of this application is neither commonly known nor used. According to the nacelle rotating mechanism disclosed in the specification of the aforementioned application, even if excessive external forces act on one drive unit for a windmill when a plurality of drive units for a windmill are installed, there is a mechanism for preventing breakage in that drive unit for a windmill. The mechanism for preventing breakage in a drive unit for a windmill in the aforementioned nacelle rotating mechanism is provided in a driving force transmission path that is a path through which a driving force is transmitted from the output shafts of the electric motors to the pinions, and is constituted as a cutaway portion that serves as a disconnection mechanism for disconnecting the driving force transmission path under the action of a torque of a predetermined magnitude or more.

While the drive unit for a windmill to which the pinion of the output shaft of an electric motor is fixed is disclosed in Patent Document 1, it is desirable, in order to improve output torque and downsize the configuration, that a speed reduction portion that slows down and transmits a rotational driving force be provided between the output shaft of an electric motor and the pinion. However, if the aforementioned cutaway portion serving as a mechanism for preventing breakage in a drive unit for a windmill is provided in the driving force transmission path, there is the possibility that when the cutaway portion serving as the disconnection mechanism is activated and has disconnected the path, broken pieces generated by the disconnection may directly enter and intrude into the speed reduction portion. This may cause the broken pieces to make scratches on slide faces of gears and rolling faces of bearings in the speed reduction portion, resulting deterioration in durability. In addition, there is the possibility that the broken pieces caught in the speed reduction portion may stop the rotation of the speed reduction portion, causing a loss of the yaw drive function and breakage in the ring gear. Thus, in the case of replacing this cutaway portion after the activation of the cutaway portion, the operation of checking whether or not there is an intrusion of broken pieces into the speed reduction portion is necessary, which results in a further increase in the burden of the replacement operation. Accordingly, when the cutaway portion is provided as a mechanism for preventing breakage in a drive unit for a windmill, it is desirable to realize a configuration that is capable of facilitating the replacement operation of the cutaway portion.

In view of the foregoing circumstances, it is an object of the present invention to provide a drive unit for a windmill that is configured such that even if excessive external forces act on one drive unit for a windmill when a plurality of drive units for a windmill are installed and used, breakage in that drive unit for a windmill can be prevented, and even if a cutaway portion is provided as a mechanism for preventing breakage, the replacement operation of the cutaway portion can be readily performed.

Means for Solving the Problem

A drive unit for a windmill according to a first aspect of the present invention for achieving the above-described object includes a pinion that meshes with a ring gear that is fixed to a first structure in a movable portion of a windmill, an electric motor that is fixed to a second structure that is rotatably installed on the first structure in the movable portion, an output shaft that outputs a rotational driving force of the electric motor, an input shaft that is coupled to the output shaft and receives input of a rotational driving force from the electric motor, an output portion that is fixed to the pinion, a speed reduction portion that is coupled to the input shaft and the output portion, slows down and transmits the rotational driving force that is input to the input shaft, and outputs the rotational driving force to the output portion, a body that houses the input shaft and the speed reduction portion, and a braking mechanism for stopping the output shaft. The drive unit for a windmill according to the first aspect of the present invention further includes a cutaway portion that is provided in a driving force transmission path and serves as a disconnection mechanism for disconnecting the driving force transmission path under the action of a torque of a predetermined magnitude or more, the driving force transmission path being a path through which a driving force is transmitted from the output shaft to the pinion, and a partitioning portion that is provided inside the body and disposed between the cutaway portion and the speed reduction portion so as to partition an area between the cutaway portion and the speed reduction portion.

In the case where a plurality of drive units for a windmill are installed and used in the movable portion of the windmill, if external forces act on the second structure with there being variation in the state of meshing engagement of the pinions with the ring gear, during the rotational operation of the second structure relative to the first structure or during a halt in the rotational operation, the external forces will intensively act on one of the drive units for a windmill. In this case, with the drive unit for a windmill according to the present invention, the cutaway portion serving as the disconnection mechanism is actuated under the action of a torque of a predetermined magnitude or more on the driving force transmission path. Also, in the case where a plurality of drive units for a windmill are installed and used, the output shaft of the electric motor of any of the drive units for a windmill may be locked due to the occurrence of problems or the like. In this case, according to the present invention, in the drive unit for a windmill in which the output shaft of the electric motor has been locked, a torque of a predetermined magnitude or more will act on the driving force transmission path by the forces of the other drive units for a windmill, and accordingly the cutaway portion (disconnection mechanism) is activated. In this way, according to the present invention, the drive unit for a windmill that is under the action of excessive external forces enters a state in which a force is not transmitted as a result of the disconnection of the driving force transmission path. With the disconnected place by the cutaway portion as a boundary, a portion on the pinion side that is coupled to the pinion is then driven so as to run at idle (turns free) relative to the portion on the electric motor side. This prevents the occurrence of damage such as to make continuous use of the drive unit for a windmill difficult and require replacement, thus preventing breakage in the drive unit for a windmill.

According to the present invention, the partitioning portion that partitions the area between the cutaway portion and the speed reduction portion within the body is provided in addition to the cutaway portion serving as the mechanism for preventing breakage in the drive unit for a windmill. Thus, when the cutaway portion is activated and has disconnected the path, the partitioning portion can shut off and prevent entry and intrusion of broken pieces generated by the disconnection into the speed reduction portion. As a result, it is possible to prevent broken pieces generated by the operation of the cutaway portion from entering the speed reduction portion and making scratches on slide faces of gears, thereby causing deterioration in durability. By preventing the intrusion of broken pieces into the speed reduction portion, it is possible to omit the operation of checking whether or not there is entry of broken pieces in the speed reduction portion during the process of replacing the cutaway portion after the operation of the cutaway portion, or to considerably reduce the work load of that operation. Accordingly, the configuration that can facilitate the replacement operation of the cutaway portion can be realized.

It is thus possible, according to the present invention, to provide a drive unit for a windmill that is configured such that even if excessive external forces act on one drive unit for a windmill when a plurality of drive units for a windmill are installed and used, breakage in that drive unit for a windmill can be prevented, and even if the cutaway portion serving as the mechanism for preventing breakage is provided, the replacement operation of the cutaway portion can be readily performed.

According to a drive unit for a windmill according to a second aspect of the invention, in the drive unit for a windmill of the first aspect of the present invention, the cutaway portion is provided in the output shaft or the input shaft, and the partitioning portion includes an inner wall portion that is provided as a wall portion inside the body and has a hole in which the input shaft is inserted, and a seal member that is disposed in the hole and provides a seal between the input shaft and the inner wall portion.

According to this aspect of the prevent invention, the partitioning portion includes the inner wall portion of the body and the seal member, and the seal member provides a seal between the input shaft that is inserted in the hole of the inner wall portion and the inner wall portion. It is thus possible to partition the area between the cutaway portion, which is provided in either the output shaft or the input shaft, and the speed reduction portion in an airtight state or a state close to the airtight state, and to more efficiently prevent the entry of broken pieces generated by the operation of the cutaway portion into the speed reduction portion.

According to a drive unit for a windmill according to a third aspect of the present invention, in the drive unit for a windmill of the second aspect of the present invention, the input shaft includes a coupling portion that is formed on one end side of the input shaft and coupled to the output shaft, an input gear portion that is formed on the other end side of the input shaft and transmits a rotational driving force to the speed reduction portion, and a seal portion that is formed between the coupling portion and the input gear portion and in which the seal member slides, and the cutaway portion is formed between the coupling portion and the seal portion of the input shaft.

According to this aspect of the present invention, the input shaft is provided with the coupling portion located on the output shaft side, the input gear portion located on the speed reduction portion side, the seal portion that is located between the coupling portion and the input gear portion and in which the seal member slides, and the cutaway portion located between the coupling portion and the seal portion. Accordingly, in the input shaft that is coupled to the output shaft and transmits a rotational driving force to the speed reduction portion, the seal portion and the cutaway portion can be disposed in series between the output shaft side and the speed reduction portion side, which makes it possible to realize the seal portion and the cutaway portion with a simple configuration.

According to a drive unit for a windmill according to a fourth aspect of the present invention, in the drive unit for a windmill of the third aspect of the present invention, the seal portion has smaller external dimensions than the coupling portion.

According to this aspect of the present invention, the seal portion is formed so as to have smaller external dimensions than the coupling portion. It is thus possible to shorten the sliding distance of the seal member per rotation of the input shaft and to further reduce the sliding speed of the seal member relative to the input shaft, as compared with the case in which the seal member is configured to slide on the outer periphery of the coupling portion. This enables an improvement in the durability of the seal member.

According to a drive unit for a windmill according to a fifth aspect of the present invention, in the drive unit for a windmill of the third aspect of the present invention, the input shaft is provided with a clearance portion that is formed in a recessed shape between the seal portion and the input gear portion to allow a tool to escape when the input gear portion is processed, and the cutaway portion has smaller external dimensions than the clearance portion.

According to this aspect of the present invention, the external dimensions of the cutaway portion are set to be smaller than those of the clearance portion that is required when processing the input gear portion. It is thus possible to prevent a disconnection from occurring in the clearance portion under the action of excessive external forces and to thereby allow the cutaway portion to reliably carry out the function of preventing breakage.

Effects of the Invention

According to the present invention, it is possible to provide a drive unit for a windmill that is configured such that even if excessive external forces act on one drive unit for a windmill when a plurality of drive units for a windmill are installed and used, breakage in that drive unit for a windmill can be prevented, and even if a cutaway portion is provided as a mechanism for preventing breakage, the replacement operation of the cutaway portion can be readily performed.

DESCRIPTION OF EMBODIMENTS

Hereinafter, embodiments of the present invention will be described with reference to the drawings. A drive unit for a windmill according to an embodiment of the present invention can be widely used as a drive unit for a windmill that is installed in a windmill and drives one structure (second structure) to rotate relative to another structure (first structure) in a movable portion of the windmill. In particular, the drive unit for a windmill according to the present embodiment can be used as a yaw drive unit that drives a nacelle to yaw and rotate relative to a tower of the windmill, and a pitch drive unit that drives shaft portions of blades to pitch and rotate relative to a hub on the nacelle side. Note that the following description of the present embodiment takes the example of the case in which the drive unit for a windmill is used as a yaw drive unit, but the present invention is not limited to this example and is widely applicable to other drive units for a windmill including a pitch drive unit.

Figure 1:
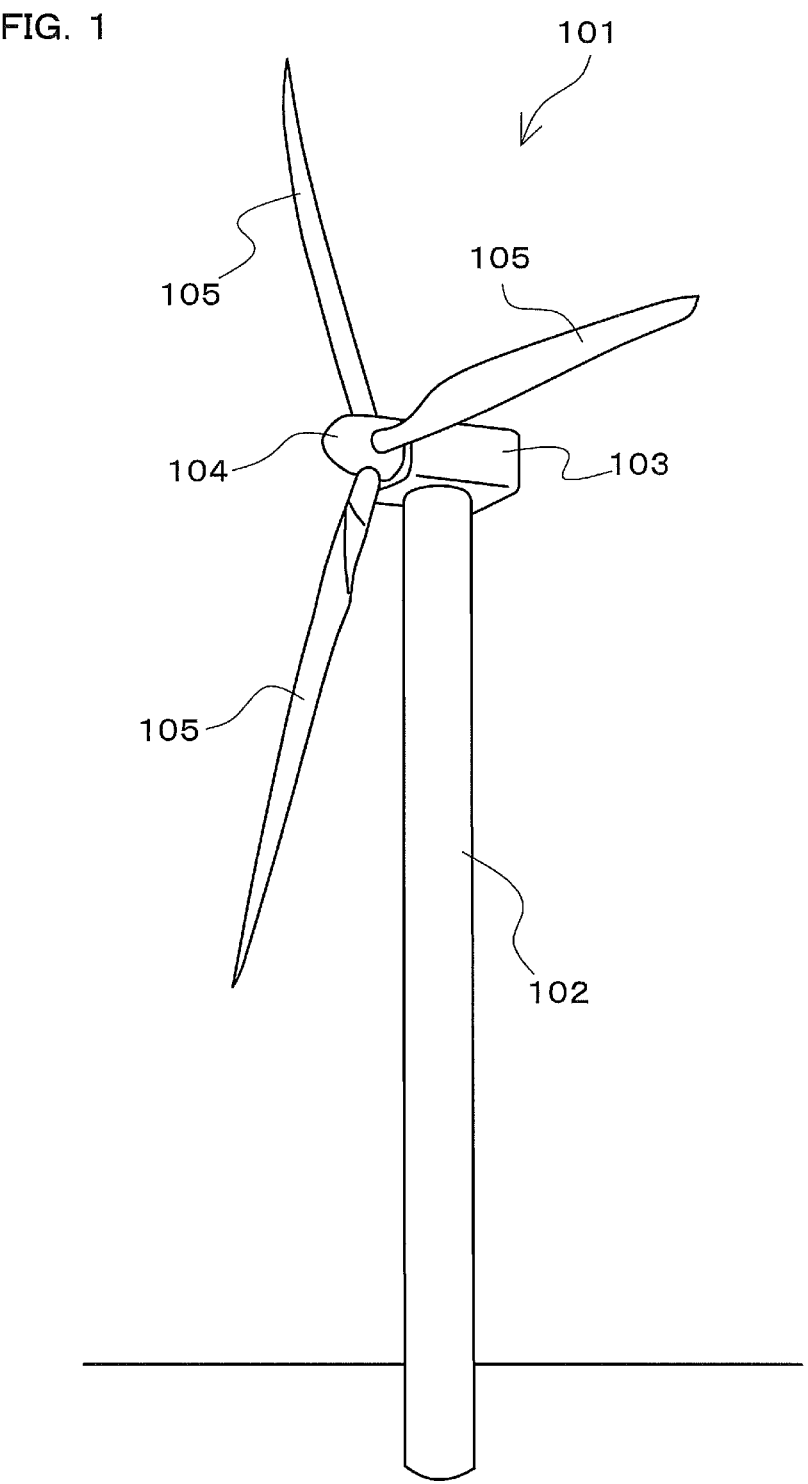
FIG. 1 is a perspective view of a windmill to which a drive unit for a windmill according to an embodiment of the present invention is applied.

FIG. 1 is a perspective view of a windmill 101 to which a drive unit for a windmill (windmill drive unit) 1 according to an embodiment of the present invention is applied. As shown in FIG. 1, the windmill 101 includes a tower 102, a nacelle 103, a hub 104 that forms a main shaft portion, and blades 105, for example. The tower 102 is installed extending vertically upward from the ground, and the nacelle 103 is rotatably installed on the top portion of the tower 102. The nacelle 103 is installed so as to be rotated (turned around) in a horizontal plane by the windmill drive unit 1, which will be described later, and a power transmission shaft, an electricity generator, and so on, which are not shown, are disposed inside the nacelle 103. The hub 104 is coupled to the aforementioned power transmission shaft and is rotatably provided on the nacelle 103. A plurality of (in this embodiment, three) blades 105 are attached to the hub 104, extending radially at equiangular intervals. Note that the blades 105 are installed on a shaft portion provided in the hub 104 so as to be rotatable relative to the hub 104 centered on the axis of the shaft portion. The blades 105 are configured to be rotationally driven by a pitch drive unit, which is not shown, so that their pitch angles are changed.

Figure 2:
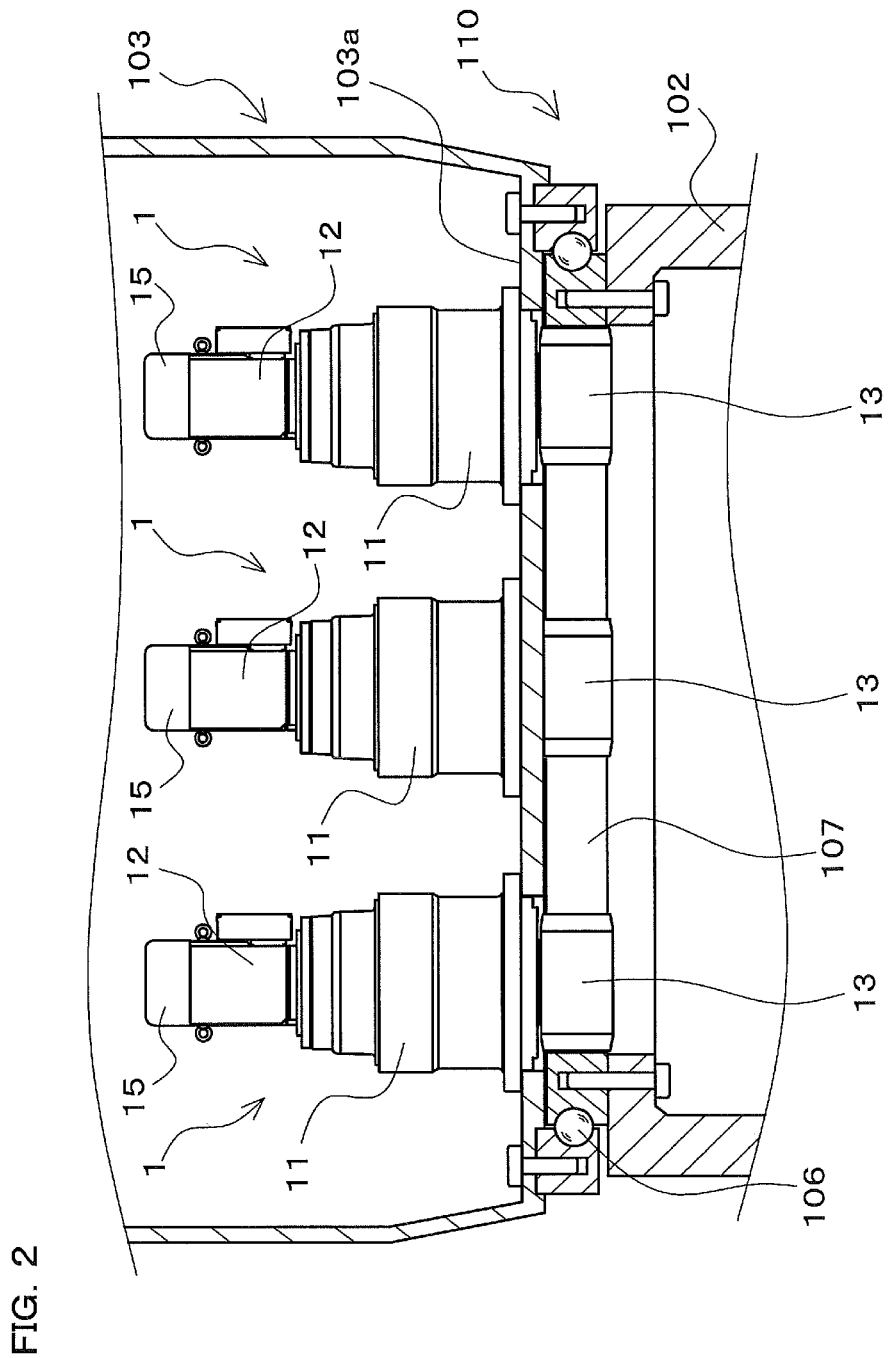
FIG. 2 is an enlarged cross-sectional view of a movable portion of the windmill shown in FIG. 1, the movable portion being a portion where a nacelle is rotatably installed on a tower.

FIG. 2 is an enlarged cross-sectional view of a movable portion 110 of the windmill 101 that is a portion where the nacelle 103 is rotatably installed on the tower 102. Note that FIG. 2 is not a cross-sectional view, but a full view of the windmill drive unit 1. The nacelle 103 is rotatably installed, at its bottom portion 103a, on the top portion of the tower 102 via bearings 106. Then, a ring gear 107 having internal teeth formed on its inner circumference is fixed to the top portion of the tower 102 (in FIG. 2, the internal teeth of the ring gear 107 are not shown). Note that the teeth of the ring gear 107 do not necessarily have to be provided on the inner circumference, and may be provided on the outer circumference.

In the nacelle 103, a plurality of windmill drive units 1 are disposed with their bodies 11 fixed to the bottom portion 103a. The bodies 11 are each fixed to an electric motor 12. The windmill drive units 1 are disposed such that their output pinions 13 project downward from holes formed in the bottom portion 103a of the nacelle 103 and mesh with the ring gear 107 (in FIG. 2, the pinions 13 are shown schematically). The windmill drive units 1 are disposed at a plurality of (e.g., four) locations in the inner circumferential direction of the ring gear 107. By installing the windmill drive units 1 in the movable portion 110 as described above, the pinions 13 in the present embodiment are configured to mesh with the ring gear 107 fixed to the tower 102, which is the first structure in the movable portion 110. The electric motors 12 are each fixed to the nacelle 103, which is the second structure, that is rotatably installed on the first structure in the movable portion 110 (i.e., the electric motors 12 are fixed to the nacelle 103 via the bodies 11).

Figure 3:
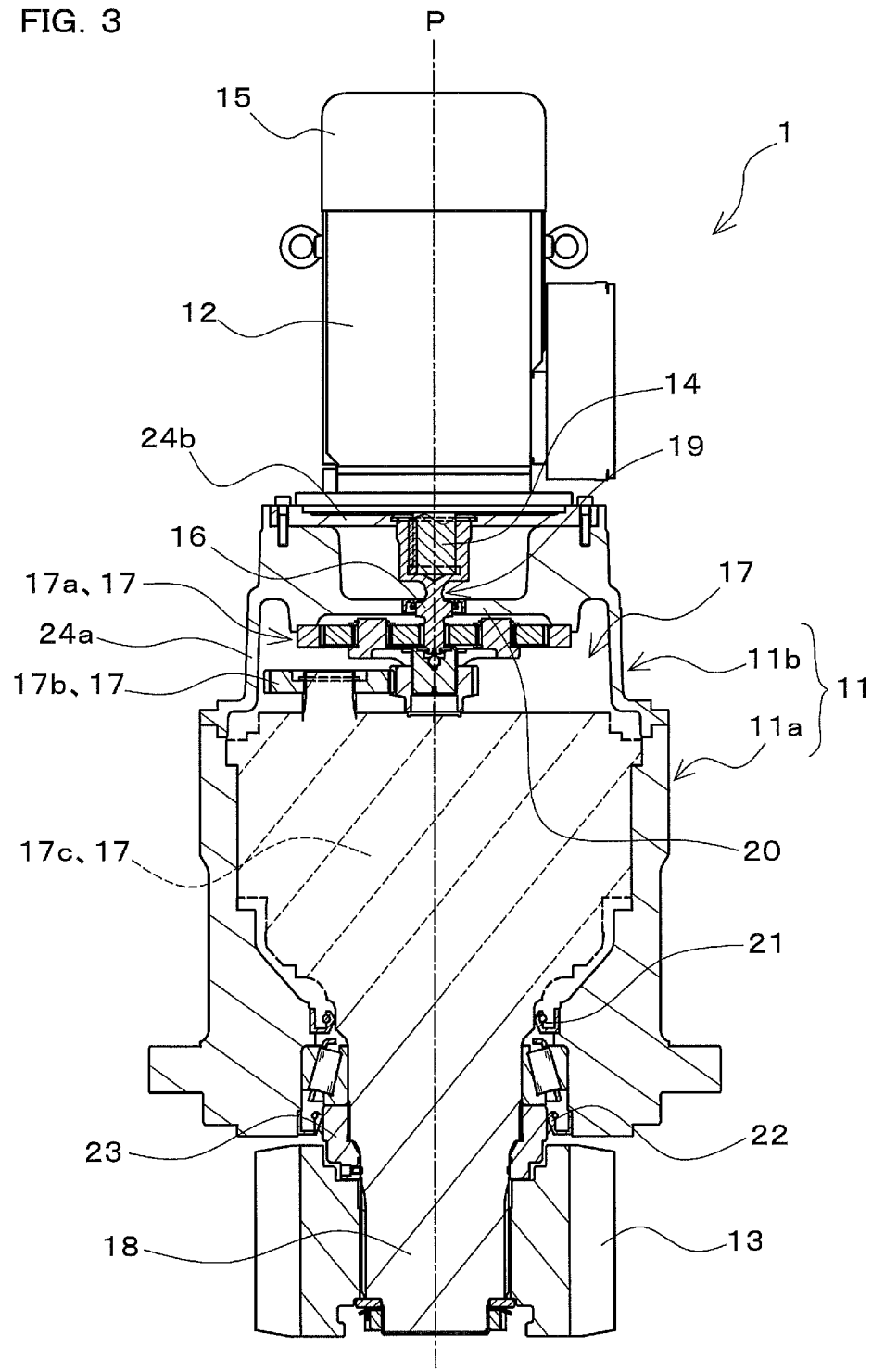
FIG. 3 is a cross-sectional view of a drive unit for a windmill according to an embodiment of the present invention, viewed from the front side.

Next is a detailed description of a windmill drive unit 1 according to an embodiment of the present invention. FIG. 3 is a cross-sectional view of a windmill drive unit 1, viewed from the front. The windmill drive units 1 shown in FIGS. 2 and 3 are provided as yaw drive units that cause the nacelle 103 to rotate relative to the tower 102 as described above. The windmill drive units 1 each include the body 11, the electric motor 12, the pinion 13, an output shaft 14, a braking mechanism 15, an input shaft 16, a speed reduction portion 17, an output portion 18, a cutaway portion 19, and a partitioning portion 20, for example.

As shown in FIGS. 2 and 3, the windmill drive units 1 are each configured such that the electric motor 12 is fixedly attached to the body 11 on one end side located on the upper side, and the output portion 18 is disposed projecting from the body 11 on the other end side located on the lower side. The pinion 13 is fixed to one end portion of the output portion 18. The windmill drive units 1 rotate the nacelle 103 by slowing down and transmitting rotational driving forces that have been input from their electric motors 12 to the pinions 13 and rotating these pinions 13 that are in meshing engagement with the ring gear 107. Note that in the following description, the input side of each windmill drive unit 1 on which the electric motor 12 is attached to is referred to as a "first end side", and the output side thereof on which the pinion 13 is disposed is referred to as a "second end side".

The output shaft 14 is provided as an output shaft portion of the electric motor 12 that outputs a rotational driving force of the electric motor 12. The input shaft 16, which will be described later, is provided as a shaft member that is coupled to the output shaft 14 and receives input of a rotational driving force from the electric motor 12. The braking mechanism 15 is attached to the electric motor 12 and provided as a friction brake for stopping the output shaft 14.

The speed reduction portion 17 is coupled to the input shaft 16 and the output portion 18 and configured to slow down and transmit a rotational driving force that is input from the input shaft 16 and output the rotational driving force to the output portion 18 to which the pinion 13 is fixed. Note that the pinion 13 is attached to the end portion of the output portion 18 on the second end side via a spline coupling and is fixed to the output portion 18 with, for example, a fixing mechanism that includes a ring nut in threaded engagement with the end portion of the output portion 18, and a ring-shaped plate member.

The speed reduction portion 17 includes, for example, a spur gear speed reducer that includes a spur gear, a planet gear speed reducer that includes a sun gear, a planet gear, and a planet carrier, an eccentric speed reducer that includes a crankshaft, an external gear, and a carrier, or a speed reducer that is formed by any combination of these speed reducers. This speed reduction portion 17 may be configured as a mechanism that includes, for example, a planet gear speed reducer 17a that receives input of a rotational driving force from an input gear portion 16b of the input shaft 16, which will be described later, a spur gear 17b that receives input of a rotational driving force from the planet gear speed reducer 17a, an eccentric speed reducer 17c that receives input of a rotational driving force from the spur gear 17b and outputs the rotational driving force to the output portion 18. In FIG. 3, the eccentric speed reducer 17c is indicated by broken lines, and a detailed illustration thereof has been omitted.

The body 11 includes a case 11a that houses the input shaft 16 and the speed reduction portion 17, and a cover 11b. Note that the output shaft 14, the input shaft 16, the speed reduction portion 17, and the output portion 18 are disposed in series in a direction along a rotation center line P (indicated by the dashed dotted line in FIG. 3) of the windmill drive unit 1 inside the body 11. The interior of the body 11 in which the speed reduction portion 17 is disposed is hermetically sealed from the outside, and lubricating oil is sealed in the body 11.

The case 11a is formed in a tubular shape having open opposite end portions. The opening on the first end side is covered with the cover 11b, and the opening on the second end side has the output portion 18 projecting therefrom. Then, output seal members (21, 22) are attached to the inner circumference of the case 11a on the second end side. The output seal members (21, 22) are each formed in a ring shape, with its lip portion being in sliding contact with a ring-shaped member that is attached to the output portion 18 and the vicinity thereof and sealing the lubricating oil in the body 11. In FIG. 3, an illustration of the lubricating oil in the body 11 has been omitted. Also, a bearing 23 is attached to the inner circumference of the end portion of the case 11a on the second end side, and the output portion 18 is rotatably held on the case 11a via the bearing 23.

The cover 11b includes a tubular member 24a that is formed in a tubular shape and attached to the case 11a so as to cover the opening of the case 11a on the first end side, and a lid member 24b that is formed in a disc shape and covers the open end portion of the tubular member 24a on the first end side. The end portion of the tubular member 24a on the second end side is fixed to the end portion of the case 11a on the first end side with bolts (not shown). The lid member 24b is fixed to the end portion of the tubular member 24a on the first end side with bolts and has a through hole formed in the center, the through hole being a hole in which the output shaft 14 is inserted and disposed. The electric motor 12 is fixed to the lid member 24b.

Figure 4:
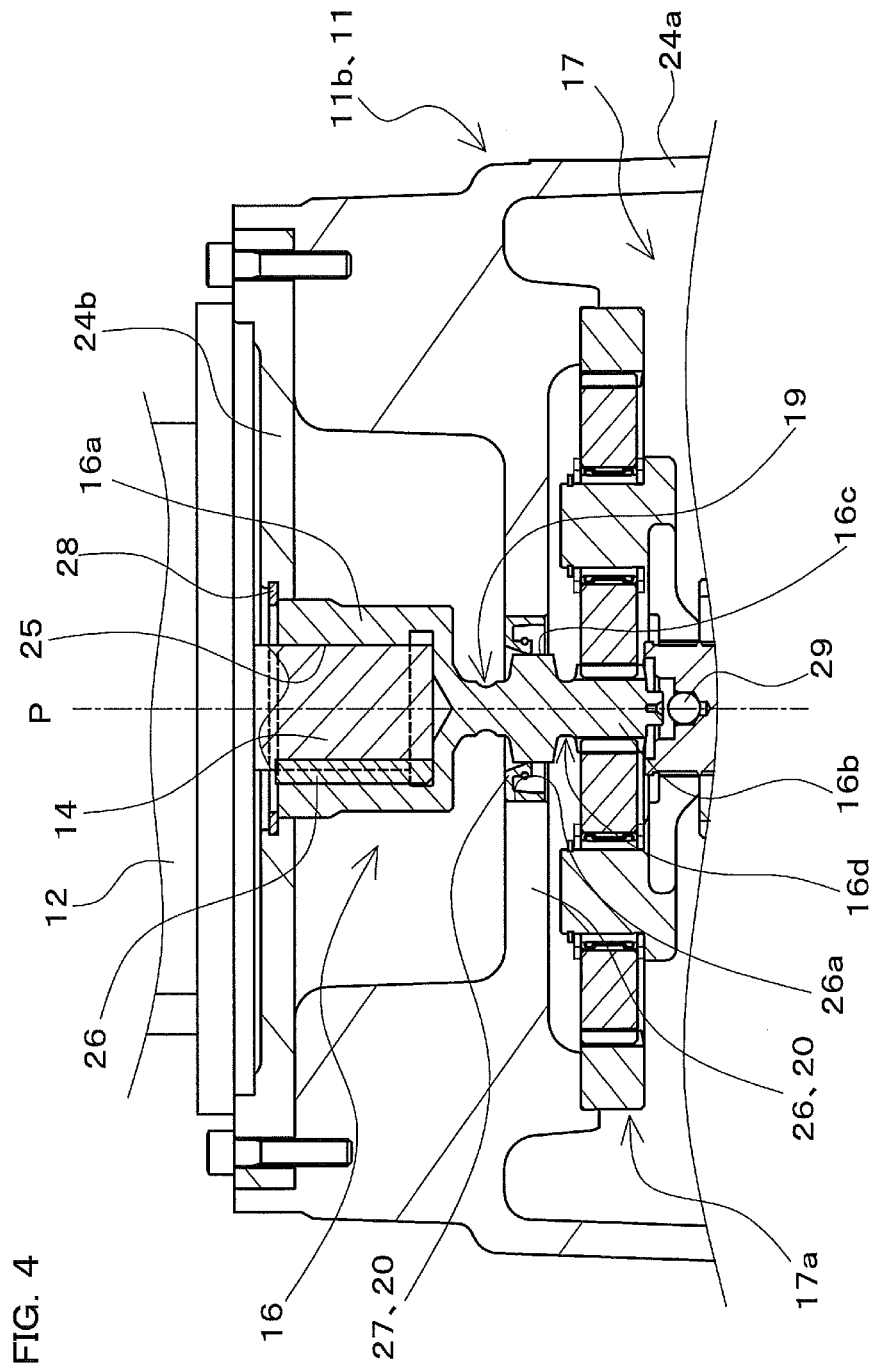
FIG. 4 is an enlarged cross-sectional view of part of FIG. 3, showing an input shaft and the vicinity thereof.
Figure 5:
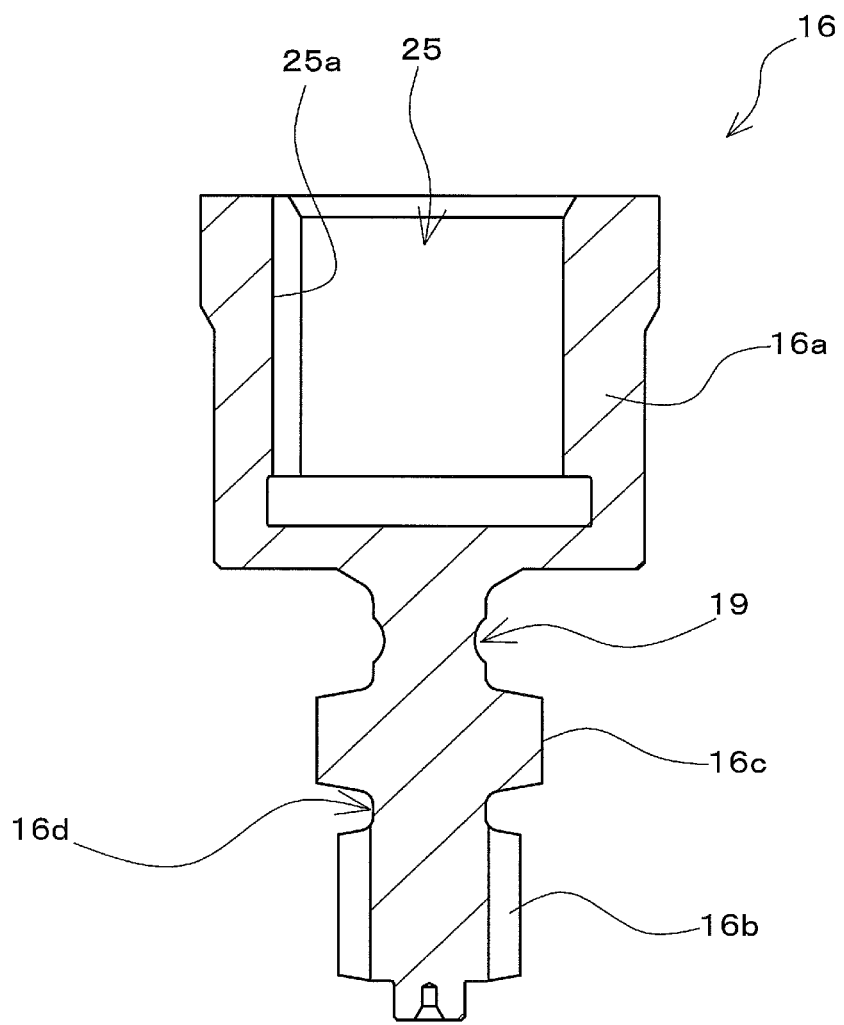
FIG. 5 is a cross-sectional view of the input shaft in the drive unit for a windmill shown in FIG. 3.

FIG. 4 is an enlarged cross-sectional view of part of FIG. 3, showing the input shaft 16 and the vicinity thereof. FIG. 5 is a cross-sectional view of the input shaft 16. As shown in FIGS. 3 to 5, the input shaft 16 is provided as a shaft member that is coupled to the output shaft 14 and transmits a rotational driving force to the speed reduction portion 17. The input shaft 16 is provided with a coupling portion 16a, the input gear portion 16b, a seal portion 16c, a clearance portion 16d, and the cutaway portion 19. The coupling portion 16a, the cutaway portion 19, the seal portion 16c, the clearance portion 16d, and the input gear portion 16b are disposed in series in this order from the first end side, forming a single entity.

The coupling portion 16a is provided as a portion that is formed in the end portion of the input shaft 16 on the first end side and is coupled to the end portion of the output shaft 14 on the second end side. This coupling portion 16a is formed as a tubular portion provided with a coupling hole 25 that is open to the first end side and in which the end portion of the output shaft 14 on the second end side is inserted. The coupling hole 25 also has a keyway 25a formed therein. Via a key 32 that is fitted in the keyway 25a, the input shaft 16 and the end portion of the output shaft 14 that is inserted so as to be fitted in the coupling hole 25 are keyed together so as to be fixedly coupled to each other. Note that a C-shaped retaining ring 28 with a part thereof being cut away in the circumferential direction is fitted in a groove that is formed along the inner circumference of the through hole that is provided in the center of the lid member 24b of the cover 11b and in which the output shaft 14 is inserted. The retaining ring 28 is brought into fitted engagement with the groove of the above through hole by first being elastically deformed in such a direction as to reduce the diameter and then being elastically recovered in such a direction as to increase the diameter, and is disposed so as to be capable of being in contact with the end portion of the coupling portion 16a on the first end side, which is disposed in the body 11. This prevents the input shaft 16 from dropping off from the body 11 to the first end side via the through hole of the lid member 24b.

The input gear portion 16b is provided as a gear wheel portion that is formed in the end portion of the input shaft 16 on the second end side, and is configured to transmit a rotational driving force to the speed reduction portion 17. The input gear portion 16b is disposed in meshing engagement with a plurality of planet gears that are rotatably held on one planet carrier in the planet gear speed reducer 17a of the speed reduction portion 17. Note that in the end portion on the second end side where the input gear portion 16b is provided, the input shaft 16 is rotatably disposed on the speed reduction portion 17 via the bearing 29 in a state in which movement of the input shaft 16 in the direction toward the speed reduction portion 17 is restricted.

The seal portion 16c is provided as a portion that is formed between the coupling portion 16a and input gear portion 16b of the input shaft 16 so as to bulge in a disc shape or a circular cylindrical shape. The seal portion 16c is configured such that its outer circumferential face is formed smooth like the outer circumferential face of a cylinder so that a seal member 27, which will be described later, can slide thereon. Note that the external dimensions (outer circumferential diameter) of the seal portion 16c are set to be smaller than those of the coupling portion 16a.

The clearance portion (recessed portion) 16d is provided as a groove-shaped portion that extends in the circumferential direction between the seal portion 16c and input gear portion 16b of the input shaft 16. This clearance portion 16d is provided as a recessed portion to allow a tool (not shown) to escape when processing the input gear portion 16b.

The cutaway portion 19 is formed between the coupling portion 16a and the seal portion 16c of the input shaft 16, as a portion that is cut away so as to have a smaller diameter than the other portions. This cutaway portion 19 is formed by cutting the input shaft 16 away in the form of a groove that has an arc shape in cross section and extends in the circumferential direction. The external dimensions (outer circumferential diameter) of the cutaway portion 19 are set to be smaller than those of the clearance portion 16d. Also, the cutaway portion 19 is provided in a driving force transmission path that is a path through which a driving force is transmitted from the output shaft 14 to the pinion 13, and is provided as a disconnection mechanism for disconnecting the driving force transmission path under the action of a torque of a predetermined magnitude or more. Specifically, the diameter of the cutaway portion 19 is set such that under the action of a torque of a predetermined magnitude or more, the input shaft 16 is cut and thereby disconnected at the cutaway portion 19 that is formed as a small-diameter portion. In this way, in the windmill drive unit 1, the input shaft 16 is provided with the cutaway portion 19 that serves as a disconnection mechanism for disconnecting the aforementioned driving force transmission path.

The partitioning portion 20 includes an inner wall portion 26 and the seal member 27 and is provided inside the body 11 and disposed between the cutaway portion 19 and the speed reduction portion 17 so as to partition an area between the cutaway portion 19 and the speed reduction portion 17. The inner wall portion 26 is provided as a wall portion that is formed inside the cover 11b of the body 11 and has a circular hole 26a formed therethrough, in which the input shaft 16 is inserted. In the present embodiment, the inner wall portion 26 is formed integral with the cover 11b, extending in a disc shape radially inward from the wall portion along the inner circumference of the cover 11b. The seal member 27 is formed in a ring shape, disposed in the hole 26a of the inner wall portion 26, and fitted in and fixed to the hole 26a, with its outer circumference in intimate contact with the inner circumference of the hole 26a. The seal member 27 is disposed such that its lip portion is in sliding contact with the outer circumferential face of the seal portion 16c of the input shaft 16 throughout the periphery thereof, and is configured to provide a seal between the input shaft 16 and the inner wall portion 26.

The above-described windmill drive unit 1 is actuated by a control device (not shown), for example, issuing a turning instruction to turn the nacelle 103 in accordance with the wind direction and thereby causing the electric motor 12 to operate, based on a detection result of a wind vane (not shown). When the operation of the electric motor 12 is started, a rotational driving force is input from the output shaft 14 to the input shaft 16 and is transmitted from the input shaft 16 to the speed reduction portion 17. Then, the speed reduction portion 17 slows down and transmits the rotational driving force, and as a result, the output portion 18 rotates and high torque is output from the pinion 13 fixed to the output portion 18. The rotation with the pinions 13 of the windmill drive units 1 in meshing engagement with the ring gear 107 causes the rotational operation of the nacelle 103 to which the plurality of windmill drive units 1 are attached. When the nacelle 103 has been rotated to the desired stop position, the operations of the electric motors 12 are stopped and the braking mechanisms 15 are activated based on an instruction from the control device, as a result of which the nacelle 103 is stopped.

On the other hand, in the case where external forces caused by the wind act on the nacelle 103 in the stopped state of the nacelle 103, the forces will act on the windmill drive units 1 in which the output shafts 14 are stopped by the braking mechanisms 15. Also, in the case where external forces caused by the wind act on the nacelle 103 during the rotational operation of the nacelle 103, reverse forces may act on the windmill drive units 1. At this time, if there is variation in meshing engagement of the pinions 13 of the windmill drive units 1 with the ring gear 107 and excessive external forces intensively act on only one of the windmill drive units 1, a torque of a predetermined magnitude or more will act on the cutaway portion 19 provided in the input shaft 16 of that windmill drive unit 1. In this case, the input shaft 16 is cut and thereby disconnected at the cutaway portion 19, and the cutaway portion 19 is activated as the disconnection mechanism. Thus, in the windmill drive unit 1, only the cutaway portion 19 provided in the driving force transmission path and serving as the disconnection mechanism is cut, and components other than the input shaft 16 are all protected. Furthermore, the presence of the partitioning portion 20 that is configured by the inner wall portion 26 and the seal member 27 prevents broken pieces generated when the cutaway portion 19 is cut from entering and intruding into the speed reduction portion 17.

Also, in the case where the output shaft 14 of one of the windmill drive units 1 is locked due to some problems in the electric motor 12 thereof or abnormality in the control system or the like, torque for the other windmill drive units 1 causing the ring gear 103 to rotate will be concentrated on the one windmill drive unit 1, and a torque of a predetermined magnitude or more will act on the cutaway portion 19 of the input shaft 16 of that windmill drive unit 1. In this case, the input shaft 16 is cut at the cutaway portion 19, and the cutaway portion 19 is activated as the disconnection mechanism. Thus, as in the above-described case, in the windmill drive unit 1, only the cutaway portion 19 provided in the driving force transmission path and serving as the disconnection mechanism is cut, and components other than the input shaft 16 are all protected. Furthermore, the presence of the partitioning portion 20 prevents broken pieces generated when the cutaway portion 19 is cut from entering and intruding into the speed reduction portion 17.

With the windmill drive units 1 described above, in the case where a plurality of windmill drive units 1 are installed and used in the movable portion 110 of the windmill 101, if external forces act on the nacelle 103 with there being variation in the state of meshing engagement of the pinions 13 with the ring gear 107, during the rotational operation of the nacelle 103 (second structure) relative to the tower 102 (first structure) or during a halt in the rotational operation, the external forces will intensively act on only one of the windmill drive units 1. In this case, with the windmill drive unit 1, the cutaway portion 19 serving as the disconnection mechanism is activated under the action of a torque of a predetermined magnitude or more on the driving force transmission path. Also, in the case where a plurality of windmill drive units 1 are installed and used, the output shaft 14 of the electric motor 12 of any of the windmill drive units 1 may be locked due to the occurrence of problems or the like. In this case, according to the present embodiment, in the windmill drive unit 1 in which the output shaft 14 of the electric motor 12 has been locked, a torque of a predetermined magnitude or more will act on the driving force transmission path by the forces of the other windmill drive units 1, and accordingly the cutaway portion 19 is activated. In this way, according to the present embodiment, the windmill drive unit 1 that is under the action of excessive external forces enters a state in which a force is not transmitted as a result of the disconnection of the driving force transmission path. With the disconnected place by the cutaway portion 19 as a boundary, the portion on the pinion side that is coupled to the pinion 13 is then driven so as to run at idle (turns free) relative to the portion on the electric motor 12 side. This prevents the occurrence of damage such as to make continuous use of the windmill drive unit 1 difficult and require replacement, thus preventing breakage in the windmill drive unit 1.

Furthermore, according to the present embodiment, the partitioning portion 20 that partitions the area between the cutaway portion 19 and the speed reduction portion 17 inside the body 11 is provided in addition to the cutaway portion 19 serving as a mechanism for preventing breakage in the windmill drive unit 1. Thus, when the cutaway portion 19 is activated and has disconnected the path, the partitioning portion 20 can shut off and prevent the entry and intrusion of broken pieces generated by the disconnection into the speed reduction portion 17. As a result, it is possible to prevent broken pieces generated by the operation of the cutaway portion 19 from entering the speed reduction portion 17 and making scratches on slide faces of gears, thereby causing deterioration in durability. By preventing the intrusion of broken pieces into the speed reduction portion 17, it is possible to omit the operation of checking whether or not there is entry of broken pieces in the speed reduction portion 17 during the process of replacing the cutaway portion 19 after the operation of the cutaway portion 19, or to considerably reduce the work load of that operation. Accordingly, the configuration that can facilitate the replacement operation of the cutaway portion 19 can be realized.

It is thus possible, according to the present embodiment, to provide a windmill drive unit 1 that is configured such that even if excessive external forces act on one windmill drive unit 1 when a plurality of windmill drive units 1 are installed and used, breakage in that windmill drive unit 1 can be prevented, and even if the cutaway portion 19 serving as the mechanism for preventing breakage is provided, the replacement operation of the cutaway portion 19 can be readily performed.

Furthermore, according to the windmill drive unit 1, the partitioning portion 20 includes the inner wall portion 26 of the body 11 and the seal member 27, and the seal member 27 provides a seal between the input shaft 16 inserted in the hole 26a of the inner wall portion 26 and the inner wall portion 26. It is thus possible to partition the area between the cutaway portion 19, which is provided in the input shaft 16, and the speed reduction portion 17 in an airtight state or a state close to the airtight state, and to more efficiently prevent the entry of broken pieces generated by the operation of the cutaway portion 19 into the speed reduction portion 17. Note that if the seal member 27 that is used is provided with a dust lip portion in addition to the lip portion, the intrusion of broken pieces and foreign substance can be more efficiently prevented.

Furthermore, according to the windmill drive unit 1, the input shaft 16 is provided with the coupling portion 16a located on the output shaft 14 side, the input gear portion 16b located on the speed reduction portion 17 side, the seal portion 16c that is located between the coupling portion 16a and the input gear portion 16b and in which the seal member 27 slides, and the cutaway portion 19 located between the coupling portion 16a and the seal portion 16c. Accordingly, in the input shaft 16 that is coupled to the output shaft 14 and transmits a rotational driving force to the speed reduction portion 17, the seal portion 16c and the cutaway portion 19 can be disposed in series between the output shaft 14 side and the speed reduction portion 17 side, which makes it possible to realize the seal portion 16c and the cutaway portion 19 with a simple configuration.

Furthermore, according to the windmill drive unit 1, the seal portion 16c is formed so as to have smaller external dimensions than the coupling portion 16a. It is thus possible to shorten the sliding distance of the seal member 27 per rotation of the input shaft 16 and to reduce the sliding speed of the seal member 27 relative to the input shaft 16, as compared with the configuration in which the seal member 27 is configured to slide on the outer periphery of the coupling portion 16a. This enables an improvement in the durability of the seal member 27.

Furthermore, according to the windmill drive unit 1, the external dimensions of the cutaway portion 19 are set to be smaller than those of the clearance portion 16d that is required when processing the input gear portion 16b. It is thus possible to prevent a disconnection from occurring in the clearance portion 16d under the action of excessive external forces and to thereby allow the cutaway portion 19 to reliably carry out the function of preventing breakage.

While the above has been a description of an embodiment of the present invention, the present invention is not limited to the above-described embodiment, and various modifications can be made in the scope recited in the claims. For example, the following variations are possible.

(1) While the above-described embodiment takes the example of the case where the windmill drive unit is provided as yaw drive units, this case does not need to be the case. It is also possible to implement a windmill drive unit as a pitch drive unit that drives the blades, each of which is the second structure in the movable portion of the windmill, to rotate relative to the hub provided on the nacelle side, which is the first structure.

(2) While the above-described embodiment takes the example of the case where the cutaway portion serving as the disconnection mechanism is provided in the input shaft, this does not need to be the case. Specifically, a configuration is possible in which the cutaway portion is provided at a position in the driving force transmission path that is other than positions in the input shaft and that is partitioned from the speed reduction portion by the partitioning portion. For example, the cutaway portion may be provided in the output shaft that outputs a rotational driving force of the electric motor. In this case, the seal member of the partitioning portion may be configured to be disposed in sliding contact with either the output shaft of the electric motor or the coupling portion of the input shaft.

(3) While the above-described embodiment takes the example of the configuration in which the retaining ring serving as a member for preventing dropping off of the input shaft is attached to the though hole formed in the center of the lid member of the cover of the body, this does not need to be the case. For example, a configuration is possible in which a member for preventing dropping off of the input shaft is disposed in the vicinity of the seal member of the partitioning portion. In this case, the cover of the body can be configured without the lid member.

(4) While the above-described embodiment takes the example of the configuration in which the partitioning portion is constituted by the inner wall portion and the seal member, this does not need to be the case. For example, the partitioning portion may be configured by a wall portion that is separately formed inside the body. A configuration is also possible in which the inner wall portion is formed in a shape other than a disc shape. Another configuration is also possible in which no seal member is provided.

Figure 6:
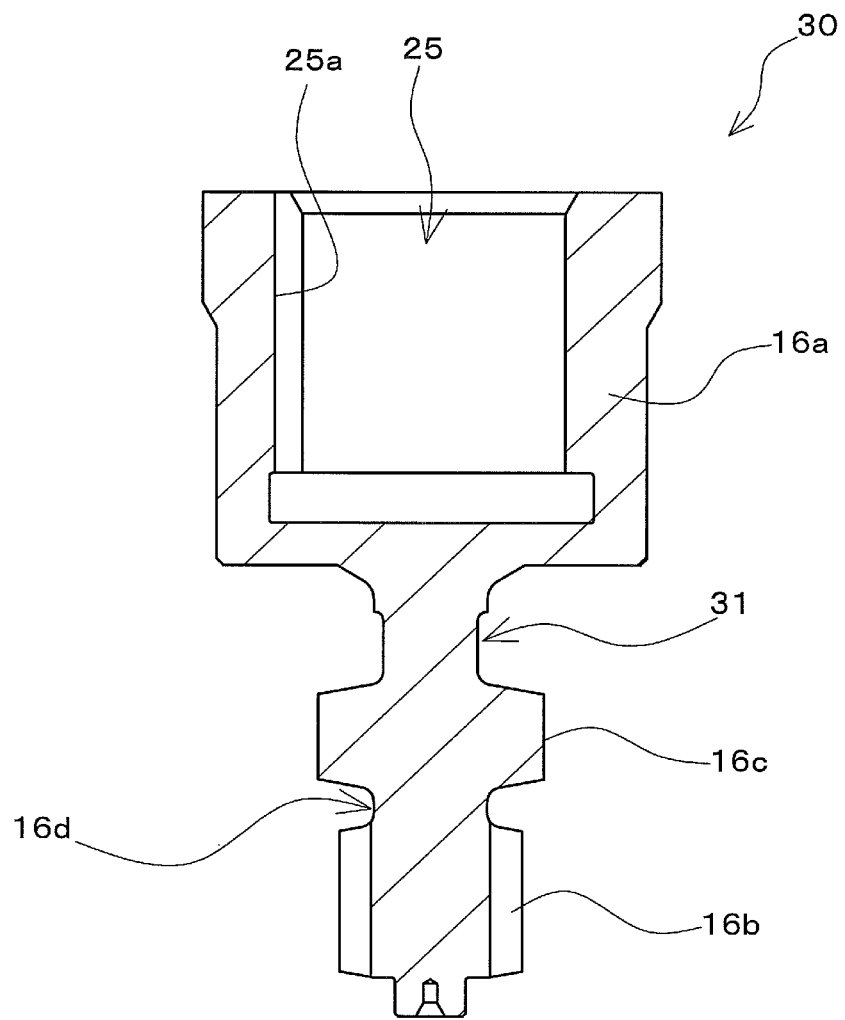
FIG. 6 is a cross-sectional view of an input shaft according to a variation.

(5) While the above-described embodiment takes the example of the configuration in which the cutaway portion is formed by being cut away in the form of a groove that has an arc shape in cross section and extends in the circumferential direction, this does not need to be the case. The cutaway portion may be provided in a shape other than that illustrated in the above-described embodiment. For example, the cut- away portion may be provided in a shape shown in FIG. 6. FIG. 6 is a cross-sectional view of an input shaft 30 according to a variation. The input shaft 30 shown in FIG. 6 is formed in the same manner as the input shaft 16 shown in FIG. 5 and is provided with a coupling portion 16a, an input gear portion 16b, a seal portion 16c, a clearance portion 16d, and a cutaway portion 31. Note that the cutaway portion 31 has a shape different from that of the cutaway portion 19 of the input shaft 16. In the description of the variation shown in FIG. 6, components that are the same as those of the input shaft 16 shown in FIG. 5 are denoted by the same reference numerals, and descriptions thereof have been omitted. The cutaway portion 31 serving as a disconnection mechanism provided in the input shaft 30 shown in FIG. 6 is formed by being cut away in the form of a groove that has a generally rectangular shape in cross section and extends in the circumferential direction. In this way, even with the cutaway portion that has a linear shape in cross section, instead of a curved shape, the same effect as in the above-described embodiment can be achieved. Note that corner portions of the groove-like cutaway portion 31 that has a generally rectangular shape in cross section are formed so as to include smoothly curved portions in order to avoid stress concentration.

INDUSTRIAL APPLICABILITY

The present invention is widely applicable as a drive unit for a windmill that is installed in a windmill and drives one structure to rotate relative to another structure in a movable portion of the windmill.

DESCRIPTIONS OF REFERENCE NUMERALS

1 Drive unit for a windmill
11 Body
12 Electric motor
13 Pinion
14 Output shaft
15 Braking mechanism
16 Input shaft
17 Speed reduction portion
18 Output portion
19 Cutaway portion
20 Partitioning portion
101 Windmill
102 Tower (first structure)
103 Nacelle (second structure)
110 Movable portion

The invention claimed is:

1. A drive unit for a windmill comprising:
a pinion that meshes with a ring gear that is fixed to a first structure in a movable portion of a windmill;
an electric motor that is fixed to a second structure that is rotatably installed on the first structure in the movable portion;
an output shaft that outputs a rotational driving force of the electric motor;
an input shaft that is coupled to the output shaft and receives input of a rotational driving force from the electric motor;
an output portion that is fixed to the pinion;
a speed reduction portion that is coupled to the input shaft and the output portion, slows down and transmits the rotational driving force that is input to the input shaft, and outputs the rotational driving force to the output portion;

a body that houses the input shaft and the speed reduction portion; and a braking mechanism for stopping the output shaft, the drive unit for a windmill further comprising:

a cutaway portion that is provided in a driving force transmission path and serves as a disconnection mechanism for disconnecting the driving force transmission path under the action of a torque of a predetermined magnitude or more, the driving force transmission path being a path through which a driving force is transmitted from the output shaft to the pinion, and a partitioning portion that is provided inside the body and disposed between the cutaway portion and the speed reduction portion so as to partition an area between the cutaway portion and the speed reduction portion.

2. The drive unit for a windmill according to claim 1, wherein the cutaway portion is provided in the output shaft or the input shaft, and the partitioning portion includes:

an inner wall portion that is provided as a wall portion inside the body and has a hole in which the input shaft is inserted; and a seal member that is disposed in the hole and provides a seal between the input shaft and the inner wall portion.

3. The drive unit for a windmill according to claim 2, wherein the input shaft includes:

a coupling portion that is formed on one end side of the input shaft and coupled to the output shaft;

an input gear portion that is formed on the other end side of the input shaft and transmits a rotational driving force to the speed reduction portion; and a seal portion that is formed between the coupling portion and the input gear portion and in which the seal member slides; and the cutaway portion is formed between the coupling portion and the seal portion of the input shaft.

4. The drive unit for a windmill according to claim 3, wherein the seal portion has smaller external dimensions than the coupling portion.

5. The drive unit for a windmill according to claim 3, wherein the input shaft is provided with a clearance portion that is formed in a recessed shape between the seal portion and the input gear portion to allow a tool to escape when the input gear portion is processed, and the cutaway portion has smaller external dimensions than the clearance portion.

* * * * *